April 26, 1949.　　　G. G. LANDIS ET AL　　　2,468,371
METHOD OF ARC WELDING UNDER DEEP FLUX LAYERS
Filed Jan. 20, 1945　　　　　　　　　　2 Sheets-Sheet 1
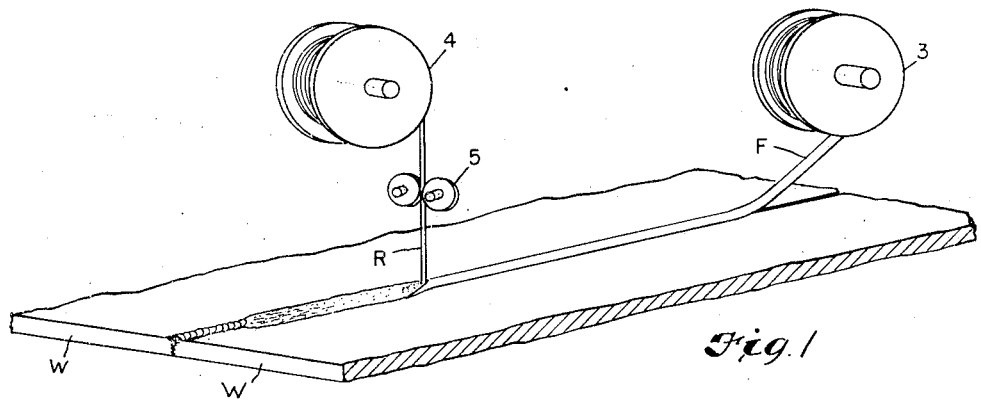
Fig. 1
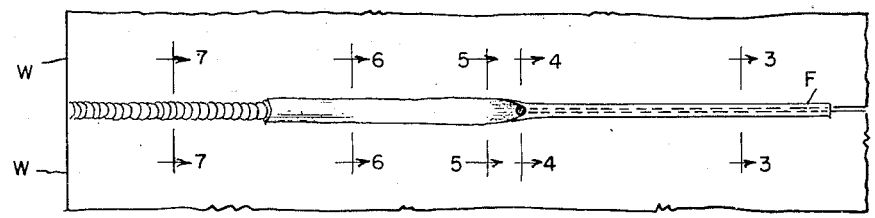
Fig. 2
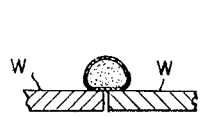 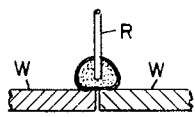 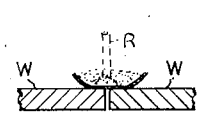 
Fig. 3　　Fig. 4　　Fig. 5　　Fig. 6
 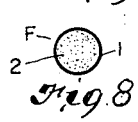 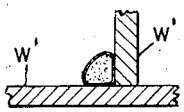 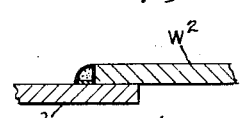
Fig. 7　　Fig. 8　　Fig. 9　　Fig. 10
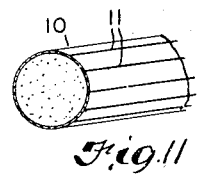 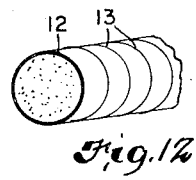 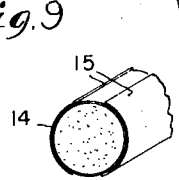 
Fig. 11　　Fig. 12　　Fig. 13　　Fig. 14
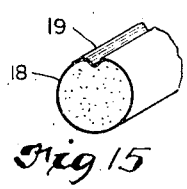 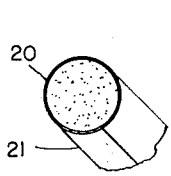 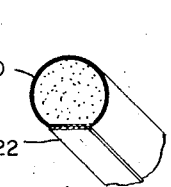
Fig. 15　　Fig. 16　　Fig. 17
INVENTORS
GEORGE G. LANDIS and
HAROLD SPENCER PAYNE
BY Oberlin & Limbach
ATTORNEYS April 26, 1949. G. G. LANDIS, ET AL 2,468,371
METHOD OF ARC WELDING UNDER DEEP FLUX LAYERS
Filed Jan. 20, 1945 2 Sheets-Sheet 2

INVENTORS
GEORGE G. LANDIS and
HAROLD SPENCER PAYNE
BY Oberlin & Limbach
ATTORNEYS Patented Apr. 26, 1949

2,468,371

UNITED STATES PATENT OFFICE 2,468,371

METHOD OF ARC WELDING UNDER DEEP FLUX LAYERS

George G. Landis, South Euclid, and Harold Spencer Payne, Cleveland, Ohio, assignors to The Lincoln Electric Company, Cleveland, Ohio, a corporation of Ohio Application January 20, 1945, Serial No. 573,700

3 Claims. (Cl. 219—10)

The present improvements, relating as indicated to methods and apparatus for arc welding, have more particular regard to methods and apparatus designed for use in metallic arc welding in which the welding operation is carried on under a deep layer of flux, i. e. the arc and the deposited weld metal are protected from the atmosphere by fluxing material in the form of a layer of powdered or granular material deposited on the work to a depth sufficient to submerge the arc.

The use of such deep flux layer in arc welding has been known and practiced for a number of years past (see Patent No. 1,782,316 to B. S. Robinoff et al., dated November 18, 1930, and article entitled "New pipe mill at McKeesport Works of National Tube Company," The Iron Age, May 17, 1931, pp. 1502 et seq.). Subsequent improvements in this method of deep flux welding have for the most part related to the composition of the flux itself. In all cases, however, substantially the same procedure has been followed in applying the flux to the work, in that a stream thereof is directed along the line to be welded so as to build up a layer or so-called windrow of desired depth. In all cases a considerable excess of flux is required in addition to that which is melted down by the action of the arc to provide the layer which actually is effective to protect the molten metal formed by interfusion of the work-pieces and the metal deposited from the weld rod. The excess of unmelted flux is ordinarily not reusable, and in any event its removal involves an additional operative step.

The present improvements have as their object the provision of means whereby such flux layer may be accurately placed along the seam in closely regulated amount and in such form has to be most effective in achieving the desired objectives, viz. submergence of the arc and protection of the weld.

A further object is to provide a flux element which will make it possible to carry out deep flux or submerged arc welding on other than a horizontal or approximately horizontal surface, e. g. on a vertical or even overhead surface.

To the accomplishment of the foregoing and related ends, said invention, then, consists of the means hereinafter fully described and particularly pointed out in the claims, the annexed drawing and the following description setting forth in detail certain means and one mode of carrying out the invention, such disclosed means and mode illustrating, however, but one of various ways in which the principle of the invention may be used.

In said annexed drawing:

Fig. 1 is a diagrammatic view in perspective illustrating my improved method and apparatus in operation;

Fig. 2 is a plan view of the same;

Figure 19:
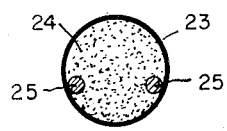
Figure 20:
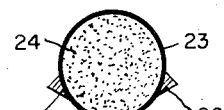
Figure 21:
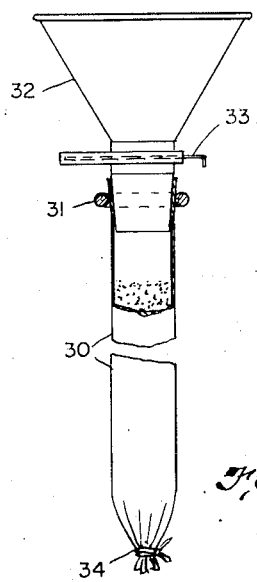
Figure 22:
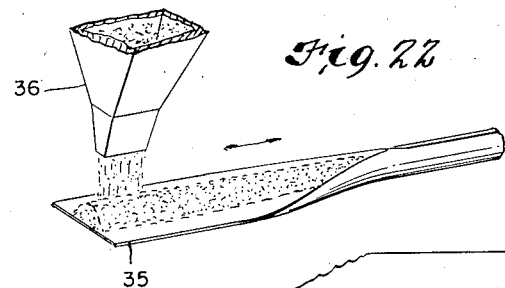
Figure 23:
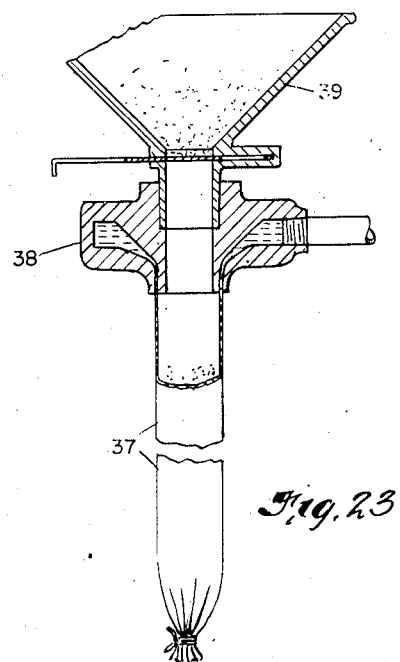
Figure 15A:
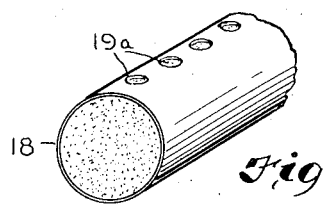

Figs. 3, 4, 5, 6 and 7 are transverse sectional views taken on the planes respectively indicated by the lines 3—3, 4—4, 5—5, 6—6 and 7—7 on Fig. 2;

Fig. 8 is a cross sectional view of the flux element in the form illustrated in the preceding figures as it appears prior to its application to the work;

Fig. 9 is a cross sectional view illustrating such flux element as applied in fillet welding;

Fig. 10 is a similar cross section showing such flux element as applied in lap welding;

Fig. 11 is a perspective view of a section of a modified form of flux element;

Fig. 12 is a similar perspective view illustrating another modification;

Figs. 13, 14, 15, 15a, 16, 17, 18, 19 and 20 are transverse sectional views of such flux element illustrating still other modifications; and Figs. 21, 22 and 23 are diagrammatic views illustrating several ways in which our improved flux element may be made.

As indicated in the foregoing general description of the figures comprised in the drawing, the distinguishing feature of my present improved method and apparatus is a novel form of flux element. This element in all of the several modified forms thus illustrated comprises a tubular casing of a thin relatively flexible material, e. g. paper or its equivalent, which will be consumable, i. e. burn up in the welding operation, without introducing any undesirable ingredient in the weld metal. Actually, as will be pointed out, such material may add to the blanketing and protective effect of the flux with which the casing is filled. Such flux may be any one of the comminuted or granular flux materials which have been or may be found satisfactory for use in deep flux welding; the particular composition of the flux forming no part of the present invention.

Referring to the form of flux element F illustrated in Figs. 1 to 10 inc., and particularly to the cross sectional view thereof shown in Fig. 8, the casing 1, as just stated, will be made of paper or equivalent material which may be quite thin, e. g. .001 inch has been found satisfactory where using cellophane. Light weight crepe paper has also been found satisfactory, and as an equivalent various kinds of woven cotton and other fabrics, although more expensive, will serve satisfactorily as the materials for such casing. Such casing may be made of indefinite length or in sections of predetermined length as may be found most convenient in carrying out the welding operation. The material employed will be such that when the casing is filled with granular flux material 2 it will be laterally flexible so that where of considerable length it may be coiled on a reel or spool. It will also be sufficiently flexible so that the casing may assume various cross sectional forms when applied to the work, i. e. flatten out when laid on a flat surface or fitted into an angular space, as will be presently described. At the same time, as will appear from the more detailed description which follows, the material of the casing should be of such composition, or so formed, that the weld rod or electrode as it is moved along the line to be welded will shear or slit the casing open along a corresponding line.

As previously stated, the flux 2 with which the casing 1 is thus filled will be a dry comminuted or granular material of any composition which is suitable for use in welding by the submerged arc process, that is a process in which the end of the weld rod or other electrode extends into a layer of flux deposited on the work-piece along the line to be welded so that the upper portion of the layer will cover or submerge the arc. The diameter of the casing 1 will of course determine the amount of flux per unit of length, and this, for reasons which will presently appear, may be made considerably less than by present methods where the flux is simply deposited in loose form as a layer or windrow along the line to be welded.

One method of using the foregoing improved flux element is illustrated in Fig. 1 where such element is shown as being drawn from a reel 3 and laid down along the line to be welded between two work-pieces W, in the form of abutting plates. Said plates, it will be understood, will be suitably supported, and either they or the reel 3 will be capable of relative movement so as to cause the reel to travel along the line to be welded as the flux element is withdrawn therefrom. In case the latter, instead of being made of indefinite length, is cut into sections, successive such sections may be laid end-to-end along the line to be welded. Weld rod R, which as shown is in the form of a flexible wire, will likewise be withdrawn from a reel 4 and fed to the work-pieces by means of feed rolls 5 at a properly regulated rate, such weld rod and the work-pieces being suitably connected in the welding circuit.

In operation, after the arc has been struck, the weld rod R is caused to move longitudinally along the median line of the flux element thus laid over the line to be welded, as best illustrated in Figs. 2 and 4, with its lower end at arcing distance from the work-pieces. The portion of the weld rod which comes in contact with the upper part of casing 1 will be sufficiently heated to burn, char or melt the material of the latter (depending upon the composition of such material) along the line of such contact and thus progressively slit the casing open, and the respective side portions thereof will tend to flatten out under the weight of the flux material. The latter is of course at the same time being rendered molten by the heat of the arc and as the casing thus flattens out it will ignite and be entirely consumed, and should there be any residual ash from the casing it will be taken up by the molten flux.

The volume of flux which is determined by the cross sectional area of the casing can be quite accurately gauged so that substantially all of the flux will be rendered molten in the course of the operation as just described. In other words, it is not necessary to supply an excess of such flux in order to insure submergence of the arc since this is accomplished by maintaining the depth of flux necessary for this purpose by the confining action of the casing walls on either side of the line where such casing is thus slit or parted by the advancing movement of the weld rod.

The successive stages in the welding operation just described will be found illustrated in Figs. 4 to 7 inclusive. In such Fig. 4 the casing is shown at the point where the weld rod parts or slits the upper portion thereof; Fig. 5 shows the side walls of the casing as they fall away; Fig. 6 shows the completed weld with the layer of molten flux covering the same; and Fig. 7 shows such completed weld after such molten flux, following solidification, has been removed.

As shown in the cross sectional view, Fig. 3, the casing of the flux element as initially applied to the work-pieces is sufficiently flexible transversely so as to permit the under side of the latter to flatten to a certain extent and yet maintain a desired vertical depth of the flux within the casing. The same result is attained where the casing is applied to the angle between angularly related work-pieces W', W', as illustrated in Fig. 9, or to overlapping work-pieces $W^2$, $W^2$, as illustrated in Fig. 10. In such case the contacting area of the casing will closely fit the angle in which the welding operation is to be carried out.

The action of the casing incidentally to the welding operation may be varied by specially forming the same instead of making such casing of paper or like material having uniform characteristics throughout. Thus in the case of the flux element illustrated in Fig. 11, while the casing 10 is made of paper as before, such paper has incorporated in it longitudinally extending stiffening strands of fibers 11. The latter are preferably of vegetable character, equally combustible along with the remainder of the casing. However, as a result of their presence the lateral portions of the casing following the slitting thereof by the electrode will be sufficiently stiffened so that they will not fall away under the weight of the flux as quickly as they would otherwise. In the modification illustrated in Fig. 12 the casing 12 has incorporated therein circumferentially extending fibers similar to fibers 11 in the previous form, and these will have much the same effect on the operation. As illustrated in Fig. 13, the same effect may also be obtained by stiffening the lateral portions 14 of the casing 15, either by forming the same of an increased thickness of the material of said casing or applying thereto a coating of sizing, water-glass, or the like.

In such last described construction the untreated area will show up as a longitudinally extending mark on the casing, which provides the added advantage of a guide for the weld rod as the latter moves along the casing; in other words, the weld rod may be more readily held along the proper median line of the casing. Such median line may also be marked, as in the form of casing 16 illustrated in Fig. 14, by applying thereto a line 17 of contrasting color; or as in the form of casing 18 illustrated in Fig. 15, an inwardly directed crimp 19 may be formed along the median line to properly guide a weld rod during the welding operation.

If desired the crimp thus formed in the casing may constitute a weakened area so as to facilitate the slitting of the casing by the electrode along the line thus defined. A similar effect may be obtained by providing a series of more or less closely spaced perforations 19a lengthwise of the casing 18 (see Fig. 15a).

In order to adapt the flux element for use on other than horizontal surfaces, a form of casing 20 illustrated in Fig. 16 may be employed, in which a coating of adhesive 21 is applied to the longitudinally extending portion thereof which is designed to contact with the work. Instead of applying such adhesive directly, a separate strip 22, carrying adhesive on both faces, may be applied to a corresponding longitudinally extending area of the casing 20, as shown in Fig. 17.

Figure 18:
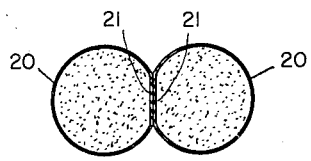

It will be understood that in the illustration of the flux element, and particularly in the sectional views of modified constructions shown in Figs. 13, 14 and 16, the relative thickness of the applied layer or coating is considerably exaggerated. Thus where a coating of sizing or like material is applied to stiffen the side walls of the casing such coating may in fact be entirely absorbed by the original material of which the casing is composed.

Where adhesive is applied to the flux-containing casing, as illustrated in Figs. 16 and 17, it will ordinarily be desirable to place over the adhesive area or strip a temporary, removable strip of cloth or the like (not shown), such as is familiarly used in connection with various types of adhesive tape, so as to protect such adhesive area and prevent it sticking when and where not wanted. Another arrangement for overcoming this difficulty is illustrated in Fig. 18 where two casings 20, each having a coating of adhesive 21 applied to a longitudinally extending portion thereof, just as in the construction of Fig. 16, are brought together with such adhesive layers opposed to each other. In this way the latter are protected and the casings can be readily separated by simply pulling them apart when it is desired to use them in the manner previously described.

Fig. 19 illustrates still another modified construction in that the flux-containing casing 23, which otherwise is identical with the one first described and illustrated in corresponding cross-section in Fig. 8, includes in addition to the flux filling 24, two longitudinally extending cords 25 of asbestos or other material which is relatively more refractory than such flux filling. These cords are disposed in parallel relation and are spaced sufficiently far apart so that when the casing is slit and the flux content thereof fused down they will lie on either side of the fluxed body of such flux and form a dam which prevents such body from spreading further than desired.

Instead of placing such continuous dam elements of more refractory material within the casing 23, they may be placed on the outside thereof as illustrated by the formed cords or strips 26 in Fig. 20. In this last-mentioned construction the dam elements may either be laid down, i. e. positioned on the work, simultaneously with the placement of the flux-containing casing thereon, or, preferably, they will be adhered to the outer surface of the casing in proper relation to each other.

Particularly where such dam-forming elements are placed within the casing, as in Fig. 19, it will be understood that they need not necessarily consist of a coherent longitudinally extended body such as the cord specifically illustrated, but may be made up of comminuted material, i. e. of discrete particles of the selected refractory material, arranged in corresponding continuous longitudinally extending layers.

It will be further understood that by the term "comminuted" as applied to both the main body of flux contained within the casing and such supplemental dam-forming bodies, it is intended to connote either granular or powdered material, i. e. the term in question does not imply any particular degree of particle fineness.

It will also be understood that while in Fig. 1 the welding apparatus diagrammatically shown is of the automatic or semi-automatic type in which the weld rod is moved along the work by suitably controlled mechanism, the operation of welding with the present improved flux element may be equally well carried out manually, i. e. the weld rod be carried by the familiar hand operated electrode holder. The latter method of operation will indeed ordinarily be employed where the line to be welded is curved or angularly disposed. In such case the flexible character of the flux element serves the further function of adapting such element to be placed in contact with the work along such irregular line, and by employing the marking feature the operation of welding is much facilitated since it enables the operator to accurately follow the weld line even though it be obscured by the interposition of the flux element.

In the case of such manual welding operation a further important advantage is obtained by the use of the present improved flux element in that the rate at which the casing of such element can be slit by movement of the electrode along the latter is determined at least in large part by the rate of consumption which initially is merely a charring or melting of the portion of the casing with which the electrode is brought in contact. Accordingly, by varying the thickness or other characteristics of the casing, or at least of the upper portion thereof which is thus contacted by the moving electrode, the rate of movement of the latter can be controlled so as to insure the obtaining of a satisfactory weld. In other words, the operator will need only to move the electrode along the flux element as fast as such movement is permitted by the progressive slitting action of the electrode.

The paper or paper-like materials referred to above as suitable for use in forming the tubular casing of the flux element may be generally defined as cellulosic compositions, and as is well known, the gases resulting from the combustion of the latter in the vicinity of an arc may be found beneficial in character and will supplement rather than detract from the protection afforded by the molten flux which is left as a covering over the weld. It is not intended, however, to limit formation of the casing from such cellulosic materials since numerous other materials, and particularly synthetic rubber substitutes and like synthetic plastics which can be formed into thin sheets having the necessary degree of flexibility, may be satisfactorily employed in the making of such casing or integument.

The placing of the comminuted flux material within the casing may be accomplished in various ways. Thus, as illustrated in Fig. 21 where the casing is preformed, a suitable length 30 thereof may be suspended from an annular support 31 and the granular material fed into the upper end of such suspended casing, by means of a funnel or hopper 32 having a control valve 33. In this method of filling the casing the lower end will of course be suitably closed as by tying the same with a string 34.

In Fig. 22 there is illustrated the method of filling the casing where the latter is initially in the form of a strip 35. A windrow of the flux is deposited from a suitable hopper 36 centrally along such strip while the latter rests on a suitable support (not shown) and travels in the direction indicated by the arrow. Following deposit of such windrow of flux, the strip is folded around the same with its edges overlapping and sealed by adhesive or in any other way.

Finally, in Fig. 23, there is shown a method of filling the casing 37 where the latter, as is entirely practical where such casing is made of certain synthetic plastic material, is formed by extrusion from a suitable die 38. In such case a valve controlled hopper 39, similar to the one employed in the first described procedure, may be associated with die 38 so that flux may be fed into the casing as it is formed.

Other modes of applying the principle of our invention may be employed instead of the one explained, change being made as regards the means and the steps herein disclosed, provided those stated by any of the following claims or their equivalent be employed.

We therefore particularly point out and distinctly claim as our invention:

1. In a process of electric welding wherein an electrode is caused to traverse a metallic workpiece along the line to be welded and a welding arc is established between the end of such electrode and such work-piece, the steps which comprise confining a body of free flowing flux within a tubular casing which is consumable at the temperature of the welding operation, placing such casing with contained flux upon such work-piece over such line to be welded, and relatively moving such electrode end longitudinally of such casing thus placed, the arcing end of such electrode extending into the flux body within such casing and the adjacent portion of said electrode serving to slit such casing as such electrode is thus moved.

2. In a process of electric welding wherein an electrode is caused to traverse a metallic workpiece along the line to be welded and a welding arc is established between the end of such electrode and such work-piece, the steps which comprise confining a body of free flowing comminuted dry flux contained within a thin walled tubular casing of cellulosic material, placing such casing with contained flux upon such work-piece over such line to be welded, and relatively moving such electrode end longitudinally of such casing thus placed, the arcing end of such electrode extending into the flux body within such casing and the adjacent portion of said electrode serving to slit such casing as such electrode is thus moved.

3. In a process of electric welding wherein an electrode is caused to traverse a metallic workpiece along the line to be welded and a welding arc is established between the end of such electrode and such work-piece, the steps which comprise confining a body of free flowing comminuted dry flux within a tubular casing which is consumable at the temperature of the welding operation, such casing with its contents being flexible both longitudinally and transversely so as to be conformable to a contacting surface, placing such casing with contained flux upon such work-piece over such line to be welded, and relatively moving such electrode end longitudinally of such casing thus placed, the arcing end of such electrode extending into the flux body within such casing and the adjacent portion of said electrode serving to slit such casing as such electrode is thus moved.

GEORGE G. LANDIS.
HAROLD SPENCER PAYNE.

REFERENCES CITED

The following references are of record in the file of this patent:

UNITED STATES PATENTS

| Number | Name | Date |
|---|---|---|
| 1,886,643 | Chapman | Nov. 8, 1932 |
| 1,978,316 | Miller | Oct. 23, 1934 |
| 1,989,371 | Land | Jan. 29, 1935 |
| 2,113,078 | Campbell | Apr. 5, 1938 |
| 2,224,753 | Yates | Dec. 10, 1940 |
| 2,331,937 | Schreiner | Oct. 19, 1943 |
| 2,348,728 | Crecca | May 16, 1944 |
| 2,360,716 | Peters | Oct. 17, 1944 |